(12) United States Patent
Thimbleby et al.

(10) Patent No.: US 9,396,581 B2
(45) Date of Patent: Jul. 19, 2016

(54) CONTACT SHADOWS IN VISUAL REPRESENTATIONS

(71) Applicant: APPLE INC., Cupertino, CA (US)

(72) Inventors: William J. Thimbleby, Sunnyvale, CA (US); Jennifer Pon Chan, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 462 days.

(21) Appl. No.: 14/057,605

(22) Filed: Oct. 18, 2013

(65) Prior Publication Data
US 2015/0109299 A1    Apr. 23, 2015

(51) Int. Cl.
*G06T 15/60*   (2006.01)
*G06T 5/00*    (2006.01)
*G06T 11/00*   (2006.01)

(52) U.S. Cl.
CPC ............... *G06T 15/60* (2013.01); *G06T 5/002* (2013.01); *G06T 11/00* (2013.01); *G06T 2207/20132* (2013.01)

(58) Field of Classification Search
None
See application file for complete search history.

(56) References Cited

U.S. PATENT DOCUMENTS

| 5,974,189    | A  | 10/1999 | Nicponski       |
|--------------|----|---------|-----------------|
| 7,982,734    | B2 | 7/2011  | Miller          |
| 8,306,399    | B1 | 11/2012 | Trottier et al. |
| 2010/0277474 | A1 | 11/2010 | Ishihara        |

OTHER PUBLICATIONS

Colin Smith, "Cast Shadow in Photoshop Tutorial", posted Nov. 30, 2005, http://photoshopcafe.com/tutorials/cast_shadow/cast_shadow.htm.*
Stephen Romaniello, NPL, "The Digital Eye: How to Create Realistic Shadows", Jan. 12, 2012, https://sdgmag.com/features/digital-eye-how-create-realistic-shadows.*
Bruce Philpott, "Creating a cast shadow", posted May 2, 006, http://brucephilpott.com/photos/castshadow.pdf.*
Patterson; "Photoshop Essentials—A Realistic Cast Shadow Effect in Photoshop;" 2013; 25 pgs.

* cited by examiner

*Primary Examiner* — Mark Zimmerman
*Assistant Examiner* — Sarah Le
(74) *Attorney, Agent, or Firm* — Fletcher Yoder PC (57) ABSTRACT

Embodiments of the present disclosure relate to a process for creating contact shadows. Specifically, embodiments of the present disclosure include converting an original image to an initial shadow image, cropping the initial shadow image to obtain at least two slices of the initial shadow image, blurring the slices, overlaying the slices to create a combined shadow image, compressing the combined shadow image to create a contact shadow, and displaying the contact shadow on a virtual surface relative to the original image. Further, a user can change the amount of blurring the contact shadow has, the apparent offset from the surface, the perspective, the opacity, and the color of the contact shadow.

25 Claims, 11 Drawing Sheets

CONTACT SHADOWS IN VISUAL REPRESENTATIONS

BACKGROUND

The present disclosure relates generally to the enhancement of visual representations using a process-implemented algorithm, and more particularly, to the creation of contact shadows for display with visual representations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various computer-implemented applications include functionality that allows a user to add images to slides or documents displayed as part of a presentation or other work product. Further application functionality typically allows the user to enhance the visual effects associated with the images. For example, computer-implemented presentation applications may allow a user to add an image to a slide and to modify the image by applying a shadow effect or a border, changing the image's opacity, and so forth. Applying a shadow effect to an image can help create an impression of perspective and depth, which may provide for a richer and more realistic looking presentation. Conversely, in the absence of such effects, an image may appear to be merely floating in a virtual workspace or as part of a two-dimensional tile, with no other spatial context.

However, shadow effects applied to images may suffer from various deficiencies that leave the effect looking unrealistic or overly simplistic, thus limiting the effectiveness of the visual effect.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The presently disclosed approaches relate to creating contact shadows for use with images displayed as part of documents (i.e., slideshow presentations, spreadsheets, word processing documents, and so forth) generated using various types of computer programs, such as presentation application, word processing programs, or spreadsheet programs. For example, the present approaches may facilitate creation of accurate representations of contact shadow effects for display with images in a computationally efficient manner.

In an embodiment of the present approach, contact shadow realism may be increased and computational cost may be reduced by taking an image that will be displayed on the generated work product and converting it to a black and white or a grayscale type image. The converted image may be cropped into various slices, where typically at least one of the slices is smaller than the other slices. The slices may undergo different degrees of blurring, and may be combined, and squashed (i.e., either vertically or horizontally compressed or collapsed) to create the appearance of perspective. The result of this approach, when displayed with the original image, creates the impression of a contact shadow where portions of the original image appear to be in contact with, or in close proximity to, the virtualized surface on which the shadow is presumably being cast. As a result, the contact shadow creates the impression that the original image is touching or hovering above or next to a surface. In addition, the present approach may allow for adjustment of the amount of blurring associated with the contact shadow, of the apparent offset from the surface, of the perspective (the apparent angle the point-of-view is from), of the opacity, and of the color or colors of the contact shadow.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

For example, certain types of computer applications (such as word processing programs, spreadsheet programs, or presentation programs) may allow a user to add images to a document or presentation. These computer applications may also allow the user to apply effects to the images in order to enhance or alter the image or the impression generated by the image. Images to which such effects may be applied include, but are not limited to text objects (e.g., character strings), shapes, pictures, graphics, and so forth. The modifications that may be made to such images are numerous and include applying a shadow effect, as discussed herein. More specifically, a contact shadow may be applied to create the impression of proximity of the image to some shadow projection surface. For example, contact shadows, as discussed herein, may be applied to any image to give the impression that the image is touching or hovering near or next to a proximate surface on which the shadow is projected. Creating a digitally specific contact shadow for such an image may be computationally intensive. Thus, as discussed herein, present embodiments may address various approaches by which the creation of contact shadows for an image results in finer tuned contact shadows at a lower computational cost.

Figure 1:
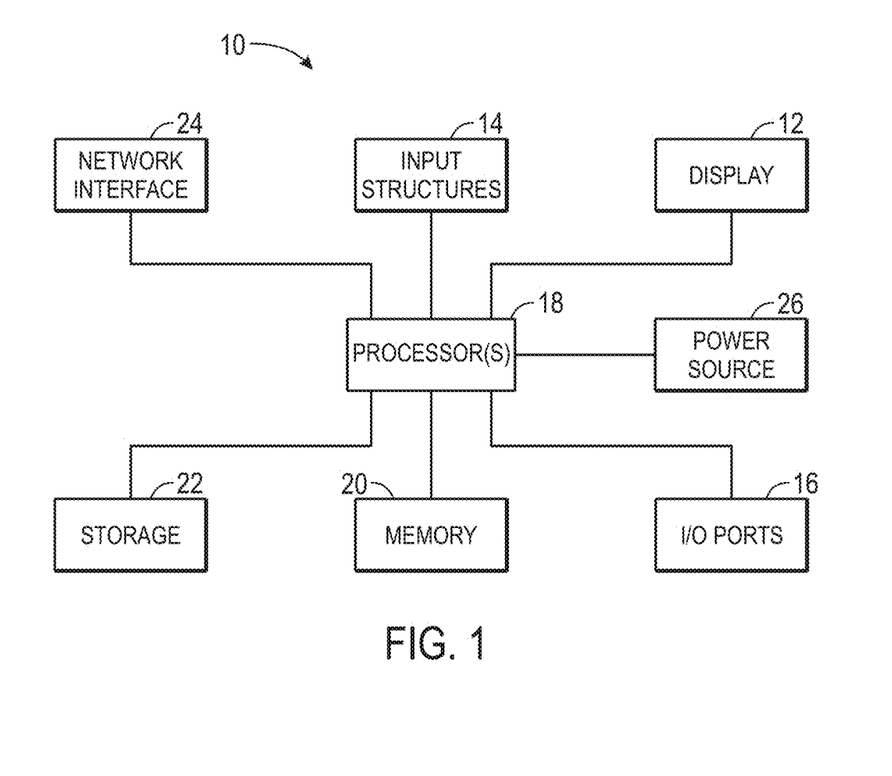
FIG. 1 is a block diagram of an electronic device that may use the techniques disclosed herein, in accordance with aspects of the present disclosure.
Figure 2:
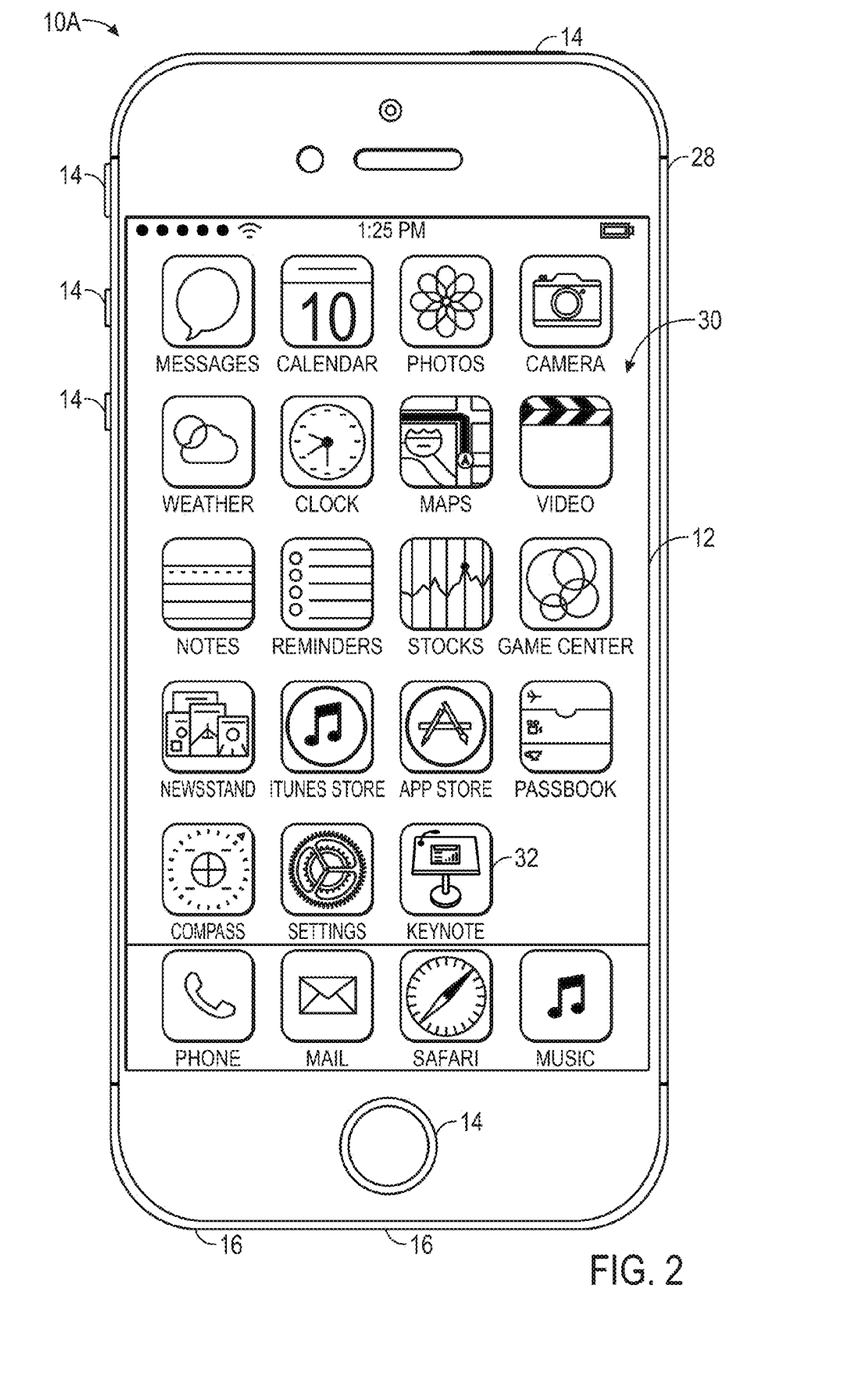
FIG. 2 is a front view of a handheld device, such as an iPhone® by Apple Inc., representing an example of the electronic device of FIG. 1.
Figure 3:
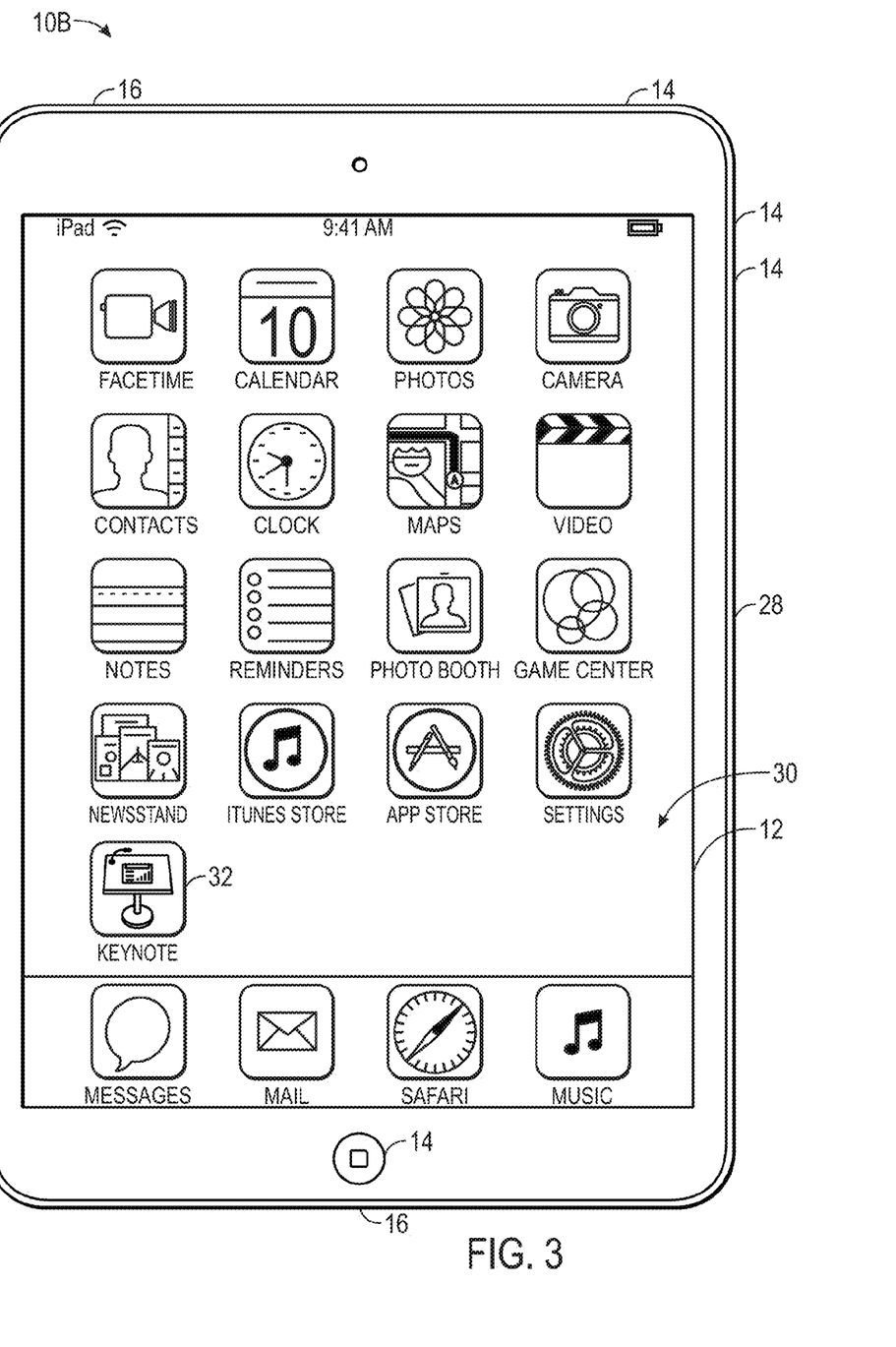
FIG. 3 is a front view of a tablet device, such as an iPad® by Apple Inc., representing an example of the electronic device of FIG. 1.
Figure 4:
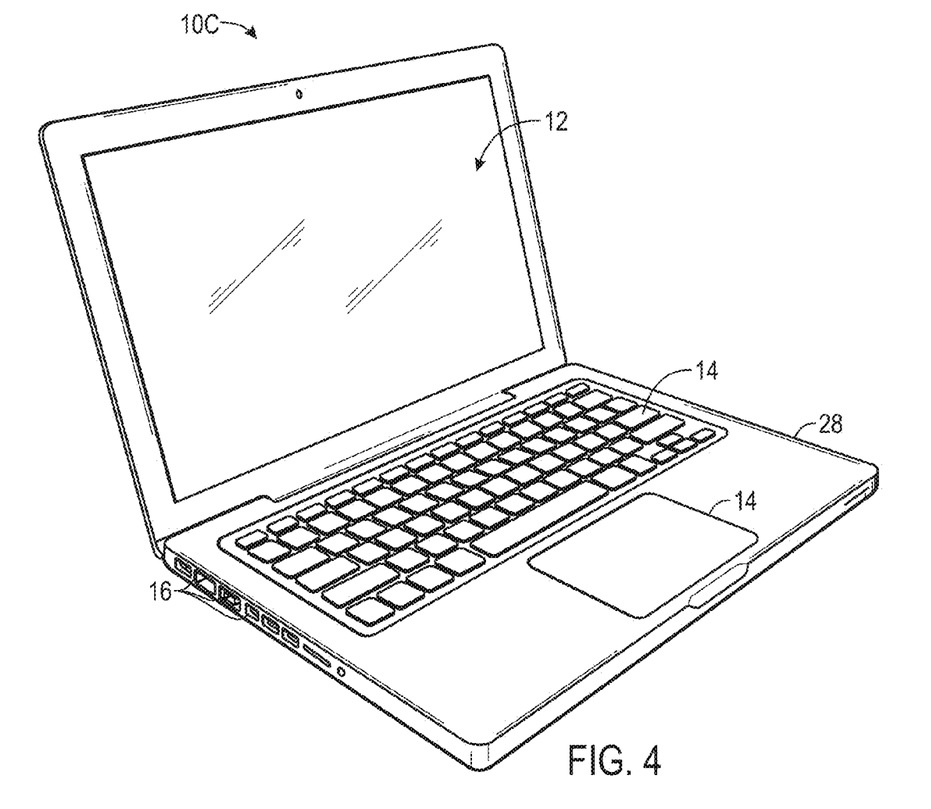
FIG. 4 is a perspective view of a notebook computer, such as a MacBook Pro® by Apple Inc., representing an example of the electronic device of FIG. 1.

With the preceding discussion in mind, a variety of suitable electronic devices may be used to create or display contact shadows as discussed herein. FIG. 1, for example, is a block diagram depicting various components that may be present in a suitable electronic device 10. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Keynote® by Apple Inc.). In some embodiments, as will be described in detail below, the application program may provide instructions to the processor(s) 18 to execute code that creates or displays a contact shadow for an object or image that is displayed by the application program.

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a presentation application program (e.g., Keynote® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the presentation application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Keynote® by Apple Inc.) running on the computer 10C.

Figure 5:
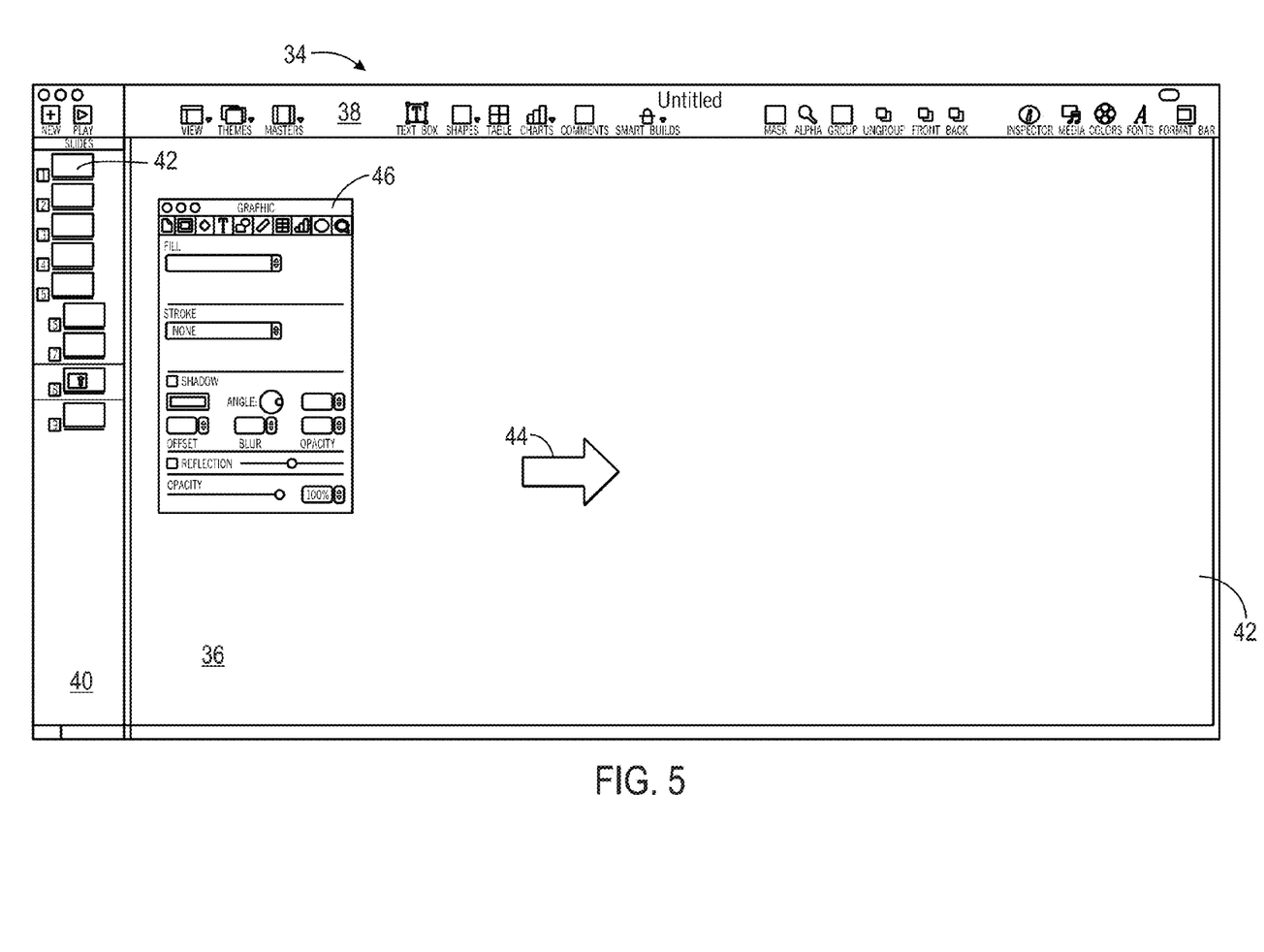
FIG. 5 illustrates a edit mode screen of a presentation application in accordance with aspects of the present disclosure.

With the preceding discussion of example systems in mind, a variety of computer program products, such as applications or operating systems, may use the techniques discussed below to enhance the user experience on the electronic device 10. Indeed, any suitable computer program product that displays and/or allows editing of shapes or images may employ the techniques discussed below to provide contact shadows for display with such shapes or images. For instance, a suitable electronic device 10 may run a presentation program 34 (e.g., Keynote® from Apple Inc.), an example screen of which is shown in FIG. 5. The presentation application 34 shown in FIG. 5 may provide multiple modes of operation, such as an edit mode and a presentation mode. In FIG. 5, the presentation application 34 is shown in the edit mode. In the edit mode, the presentation application may provide a convenient and user-friendly interface for a user to add, edit, remove, or otherwise modify the slides of a slide show. To this end, the presentation program 34 may include three panes: a canvas 36, a toolbar 38, and a slide organizer 40. The canvas 36 may display a currently selected slide 42 from among the slide organizer 40. A user may add content to the canvas 36 using tool selections from the toolbar 38. Among other things, this content may include objects 44 such as text boxes, images, shapes, and/or video objects. When in the edit mode, the user may add or remove objects and/or may assign actions and/or effects to one or more of the objects 44 associated with a slide of the slide show. For example, as will be discussed in detail below, one such effect that the user may assign to the objects is a contact shadow, as discussed herein. In the presentation mode, the user may display a created slide or a sequence of slides in a format suitable for audience viewing. In some embodiments, the presentation application may provide a full-screen presentation of the slides in the presentation mode, including any animations, transitions, or other properties or effects defined for each object within the slides.

As will be appreciated, though a presentation application is described by way of example to provide a useful context for understanding the present discussion, other computer-implemented applications may also benefit from these approaches. For example, a spreadsheet program or word processing application, either of which may allow a user to display objects in a work product, may also benefit from the present discussion regarding contact shadows and may be similarly configured to display objects with contact shadows as part of the spreadsheets or word processing documents generated using those programs.

As used herein, the term "object" refers to any individually editable component on a canvas (e.g., the canvas 36 of the presentation application 34) or other application work space. That is, content that can be added to a slide and/or be altered or edited on the slide may constitute an object. For example, a graphic, such as an image, photo, line drawing, clip art, chart, or table, that may be provided on a slide or other application work space may constitute an object. In addition, a character or string of characters may constitute an object. Likewise, an embedded video clip may also constitute an object that is a component of a slide. Applying changes or alterations of an object, such as to change its location, size, orientation, appearance or to change its content, may be understood to be changing a property of the object. Therefore, in certain embodiments, shapes, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein. In certain graphics processing contexts, the term "object" may be used interchangeably with terms such as "bitmap" or "texture."

As used herein, a "slide" should be understood to refer to a discrete unit of an ordered or sequential presentation. Such a slide, therefore, may be understood to function as a container for a set of objects (as discussed below) that together convey information about a concept. For example, a slide may contain or include different types of multimedia objects (e.g., text, numbers, images, videos, charts, graphs, and/or audio, and so forth) that explain or describe a concept to which the slide is directed and which may be handled or manipulated as a unit due to their being associated with or contained on the slide unit. As will be appreciated, in contexts other than presentation applications, the work space on which an object (and associated shadow, as discussed herein) may be placed and/or manipulated may be a spreadsheet, a document, and so forth.

The order or sequence of the slides in a presentation or slideshow is typically relevant in that the information on the slides (which may include both alphanumeric (text and numbers) and graphical components) is meant to be presented in order or sequence and may build upon itself, such that the information on later slides is understandable in the context of information provided on preceding slides. That is, there is a narrative or explanatory flow associated with the ordering or sequence of the slides. As a result, if presented out of order, the information on the slides may be unintelligible or may otherwise fail to properly convey the information contained in the presentation. This should be understood to be in contrast to more simplistic or earlier usages of the term "slide" and "slideshow" where what was typically shown was not a series of multimedia slides containing sequentially ordered content, but projected photos or images which could typically be displayed in any order without loss of information or content.

As mentioned above, the depicted example screen shown in FIG. 5 includes three panes: a slide canvas 36, a toolbar 38, and a slide organizer 40 for creating and editing various aspects of a slide of a presentation. With these panes, a user may select a slide of a presentation, add and/or edit the contents of a slide, and animate or add effects related to the contents of a slide. It should be understood that the size of each pane is merely illustrative, and that the relative size of each pane may vary or be adjusted by a user.

The slide organizer 40 may display a representation of each slide of a presentation that is being generated or edited. The slide representations may take on a variety of forms, such as an outline of the text in the slide or a thumbnail image of the slide. The slide organizer 40 may allow the user to organize the slides prepared using the application. For example, the user may determine or manipulate the order in which the slides are presented by dragging a slide representation from one relative position to another. As illustrated in FIG. 5, the slide representations in the slide organizer 40 may be indented or otherwise visually set apart for further organizational clarity.

Selecting a slide representation in the slide organizer 40 may result in the presentation application displaying the corresponding slide (e.g., slide 42) on the canvas 36. The selected slide 42 may include one or more suitable objects 44 such as, for example, text, images, graphics, video, or any other suitable object. A user may add or edit features or properties of the selected slide 42 when displayed on the slide canvas 36, such as to add a shadow effect. For example, a user may edit settings or properties associated with the selected slide 42 (e.g., the slide background or template) on the canvas 36 or may edit the location, orientation, size, properties, and/or animation of objects (e.g., object 44) in the selected slide. One such edit the user may make is applying a contact shadow effect to one or more of the objects 44. The user may select a different slide to be displayed for editing on slide canvas 36 by selecting a different slide representation from the slide organizer 40.

In the depicted implementation, a user may customize objects 44 associated with the slide 42 or the properties of the slide 42 using various tools provided by the presentation application 34 in association with the canvas 36. For example, the toolbar 38 may provide various icons that activate respective tools and/or functions that may be used in creating or editing the slide 42.

In some embodiments, the presentation application 34 may cause a control window 46 to be opened or displayed. The presentation application 34 may display the control window 46 automatically (e.g., based on the presentation application context) or in response to a user instruction (e.g., in response to a user instruction to display options related to one or more selected objects). The control window 46 may be moved, resized, and/or minimized/maximized independently of the panes 36, 38, and 40 (e.g., as an overlaid window). The control window 46 may provide one or more user input mechanisms of any suitable type, such as drop down menus, radio buttons, sliders, and so forth. The options available from control window 46 may vary based on a tool selected in toolbar 38 or by a type of object(s) 44 selected on the slide 42. For example, the control window 46 may provide different respective options if a table, video, graphic, or text is selected on the slide 42 or if no object 44 is selected. It should be understood that although only one control window 46 is shown in FIG. 5, the presentation application 34 may include any suitable number of control window 46. For example, as discussed herein with respect to FIG. 15, one such control window 46 is depicted that is configured to allow a user to adjust parameters associated with a contact shadow effect, as discussed herein.

Figure 6:
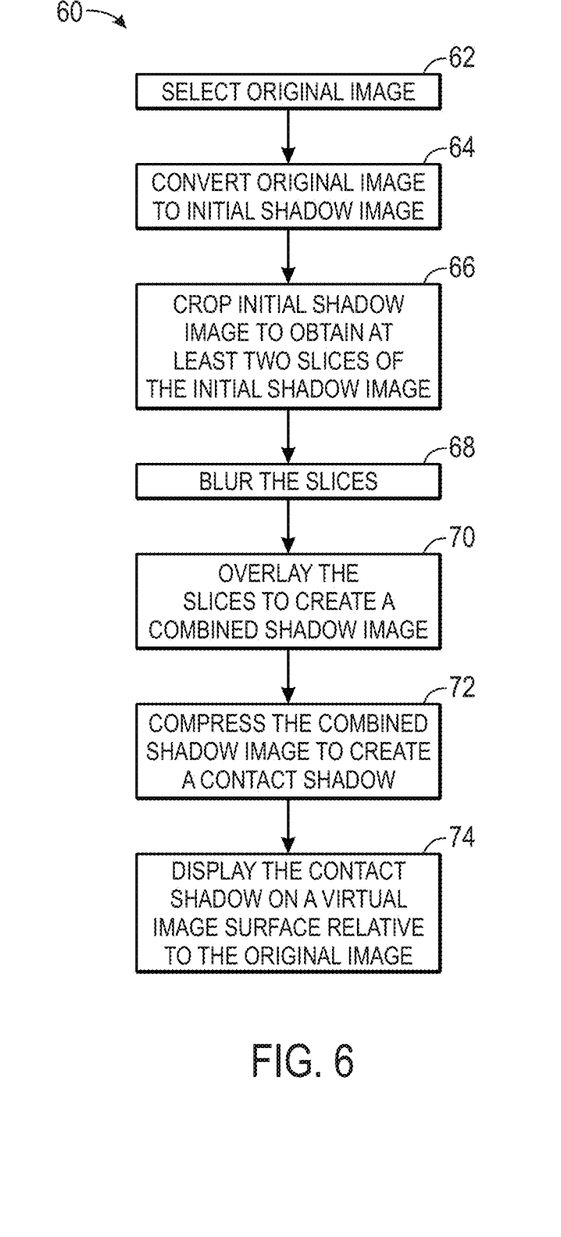
FIG. 6 is a flow chart of a method for creating contact shadows, in accordance with aspects of one embodiment of the present disclosure.
Figure 7:
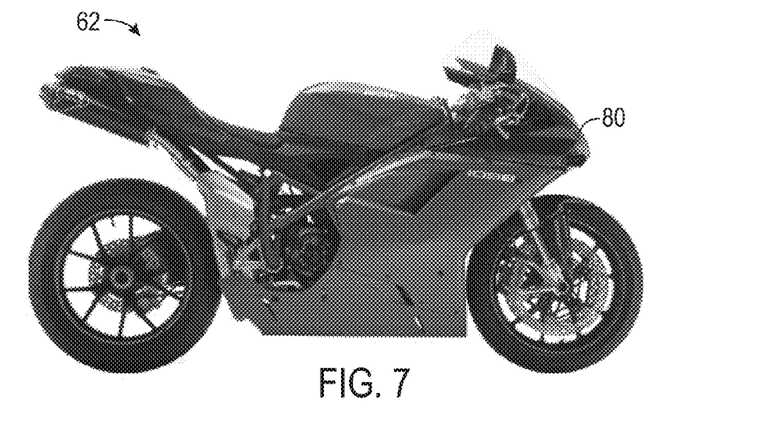
FIG. 7 is a motorcycle image, representing an original image selected in the method of FIG. 6.
Figure 8:
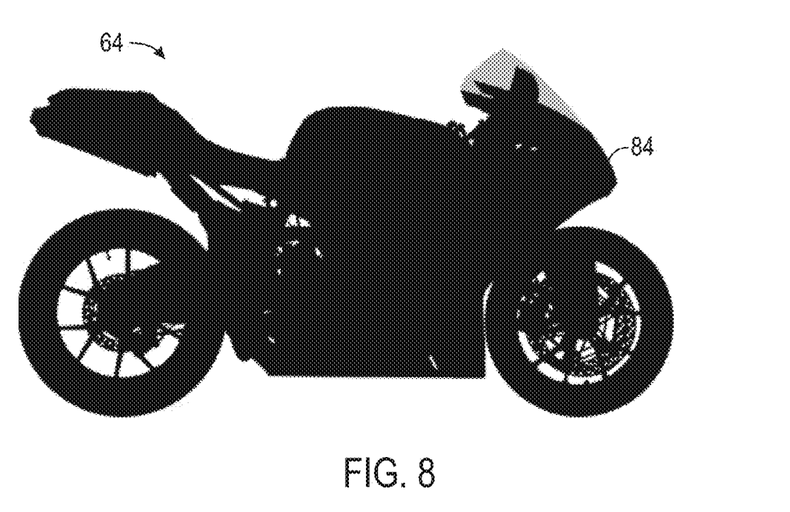
FIG. 8 is a black and white motorcycle image, representing an initial shadow image in the method of FIG. 6.

With the preceding comments in mind, a flow diagram 60 is depicted in FIG. 6 that describes a process for creating contact shadows in accordance with one implementation. In the depicted example, an original image is selected (block 62) to have a contact shadow effect applied in a computer program, such as a word processing program, presentation program, or spreadsheet program, stored and/or executed on an electronic device 10. For example, within a suitable application, such as a presentation application, an original image 80, such as a motorcycle image as shown in FIG. 7, may be selected for display on a slide or other work space. In addition, a user may select to have a contact shadow effect applied so that the depicted motorcycle will appear to be on or near the ground. In one such example, the computer program provides instructions to the processor(s) 18 to generate (block 64) an initial shadow image 84 (FIG. 8) which may be a black and white or grayscale image generated from the original image 80. By way of example, the initial shadow image 84 shown in FIG. 8 (i.e., a black and white image of the motorcycle 80 of FIG. 7) may be generated by converting the original image 80 to a black and white or grayscale image.

Figure 9:
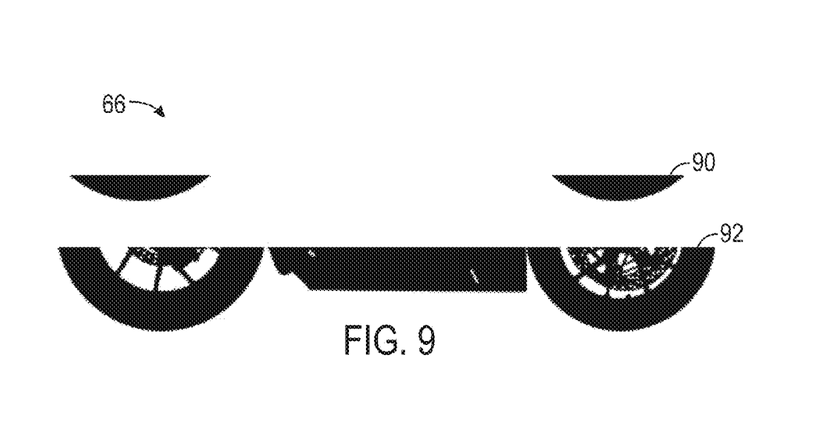
FIG. 9 depicts two slices cropped from the initial shadow image, representing an embodiment of a step of the method of FIG. 6.

In one embodiment, and returning to FIG. 6, after the original image 80 is used to generate the initial shadow image 84, the initial shadow image 84 is cropped (block 66) to obtain at least two slices (e.g., slices 90 and 92 of FIG. 9) of the initial shadow image 84, where at least one of the slices (e.g., slice 90) contains a smaller portion of the initial shadow image than the other slices (e.g., slice 92). The smaller slice may actually include a subset or subregion of the portion of the initial shadow image 84 depicted by the larger slice. That is, the smaller slice in such a scenario may actually be construed to be a slice of the larger slice. For example, FIG. 9 illustrates the resulting slices 90, 92 from the step described by block 66. As illustrated in this example, a first slice 90 and a second slice 92 have been obtained by cropping different percentages of the bottom of the initial shadow image 84. Thus, the first slice 90 contains a smaller portion of the initial shadow image 84 than the second slice 92. As used herein, the smaller first slice 90 may also be referred to as the inner slice and the larger second slice 92 may also be referred to as the outer slice because the inner slice will be used to generate an inner portion of the contact shadow and the outer slice will be used to generate an outer portion of the contact shadow. It should be noted that the slices may be cropped either horizontally or vertically based on whether the contact shadow is to be projected upwards or downwards or sideways with respect to the original image 80. For example, if the user chooses to create the impression that the original image 80 is touching or hovering near a floor or ceiling, the slices may be cropped horizontally, as shown in FIG. 9. However, if the user chooses to create the impression that the original image 80 is touching or hovering near a wall, the slices may be cropped vertically.

In certain embodiments, the amount of the initial shadow image 84 that is cropped for each slice may be determined based on a fixed ratio. For example, the size of the first slice 90 may be set to be one-third the size of the second slice 92. However, it is contemplated that other ratios may be employed or that the ratio may be adjusted by the user to control the sizes of the slices. Further, the amount of the initial shadow image 84 that is cropped for each slice may be affected by an offset (i.e., perceived separation) between the original image 80 and the virtual surface on which the shadow is projected. The offset may be set by a user with a control menu in a control window 46, which will be described in detail below, or may be preset. Likewise, the amount of the initial shadow image 84 that is cropped may be reduced by a fixed ratio as the offset is increased. In other words, the first slice 90 and second slice 92 may both shrink in size as the offset is increased to provide an impression of greater distance between the original image and the contact shadow. In some embodiments, when the offset reaches a maximum amount, the first slice 90 (i.e., the inner slice) may be removed and the second slice 92 (i.e., the outer slice) remains by itself. As an example, the maximum offset in one embodiment may be seventy pixels, beyond which the contact shadow effect is generated using only the outer slice (e.g., slice 92 in the example of FIG. 9). This transformation provides for a more visually realistic looking contact shadow.

It should be noted that the foregoing discussion is illustrative only and it is contemplated that any number of slices may be cropped from the initial shadow image 84 and used in the construction of a contact shadow effect. Indeed, the more slices that are taken and utilized in the disclosed process, the more detailed the contact shadow may become. However, as more slices are used in the contact shadow creation process, the higher the computational cost may become. Thus, in certain implementations at least two slices are taken in order to balance the computational cost with the specificity of the contact shadow.

Figure 10:
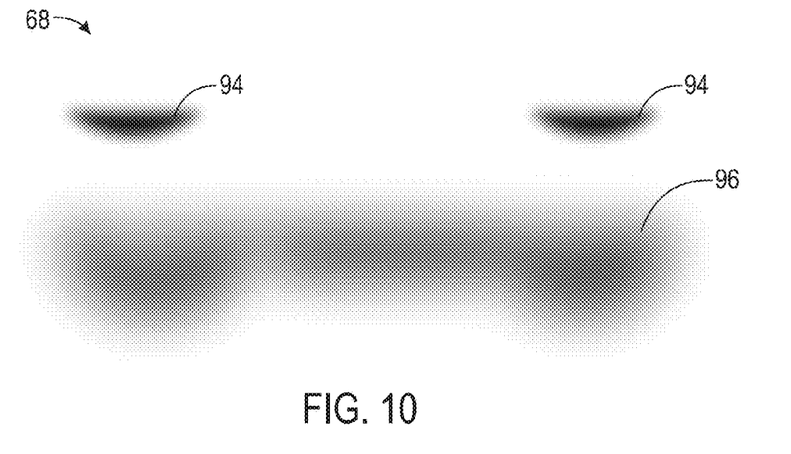
FIG. 10 depicts two blurred slices, representing an embodiment of a step of the method of FIG. 6.

The next step in the flow diagram 60 in FIG. 6 includes the act of blurring (block 68) the slices (e.g., slices 90 and 92). In one embodiment, each slice may be blurred to a different degree, e.g., the inner slice 90 may be blurred less than the outer slice 92 in this example. For example, FIG. 10 illustrates a blurred first slice 94 and a blurred second slice 96 generated using a suitable blurring function implemented on a processor of an electronic device 10. In certain embodiments, the blurring is performed by applying Gaussian blur radiuses. In certain implementations, the amount of blurring may be set or adjusted by a user with a control menu provided as part of a control window 46, as will be discussed in more detail below, or may be preset for each slice.

In one embodiment, the amount of blurring for the blurred first slice 94 and the blurred second slice 96 may be determined by a fixed ratio. For example, the fixed ratio may dictate that the blurred first slice 94 (i.e., the inner slice) receive one-third of the amount of blurring applied to the blurred second slice 96 (i.e., the outer slice). One reason for blurring the inner slice less than the outer slice is that the inner slice represents the shadow resulting from the portion(s) of the image that may be closest to or touching the virtual surface on which the shadow is projected. It should be noted that the fixed ratio may be modified by the user.

Figure 11:
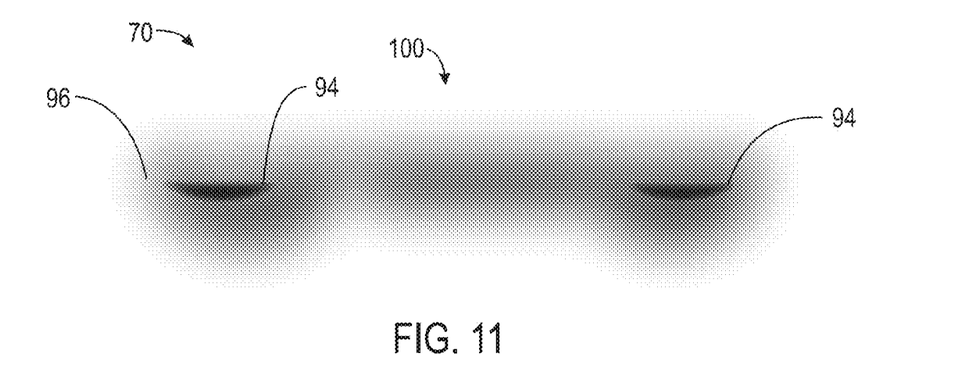
FIG. 11 depicts a combined shadow image, representing an embodiment of a step of the method of FIG. 6.
Figure 12:
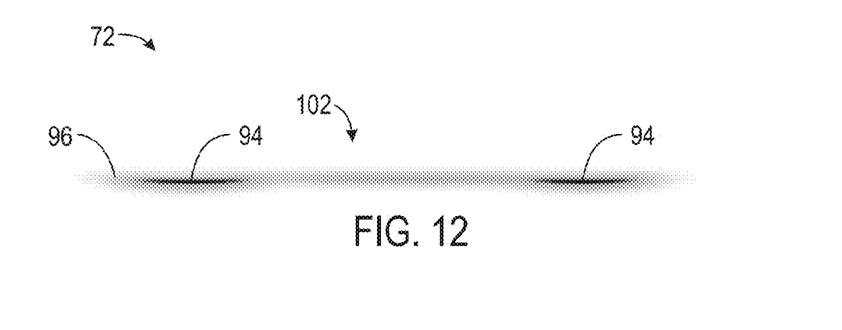
FIG. 12 depicts a compressed combined shadow image, representing an embodiment of a step of the method of FIG. 6.

Once the slices are blurred, the blurred slices 94, 96 may be superposed or overlayed (block 70) to create a combined shadow image. An example of such an operation is depicted in FIG. 11 where the blurred first slice 94 is overlayed with the blurred second slice 96 to create a combined shadow image 100. The combined shadow image 100 may then be compressed (block 72) to create a contact shadow 102. By way of example, a contact shadow 102 is depicted in FIG. 12, which includes the overlayed blurred first slice 94 and the blurred second slice 96 after compression. In some embodiments, the amount of compression is controlled by a fixed ratio, which is further controlled by variables such as how much offset, perspective, and so forth are selected by the user.

The combined shadow image 100 may be compressed either vertically or horizontally (or in some combination) based on what direction the shadow will be projected with respect to the original image 80, with vertical compression corresponding to shadows projected above or below the object 80 and horizontal compression corresponding to shadows projected to the right or left of the object 80. For example, if the user wishes to create the impression that the original image 80 is touching a floor, then the combined shadow image 100 may be compressed vertically. However, if the user wishes to create the impression that the original image 80 is touching a wall, then the combined shadow image 100 may be compressed horizontally. During this step of the process, the blurred second slice 96 (i.e., the outer slice) may also be increased in transparency to enhance the visual effect of the contact shadow 102. Additionally, in other embodiments, the combined shadow image 100 may be expanded to create a different perspective.

Figure 13:
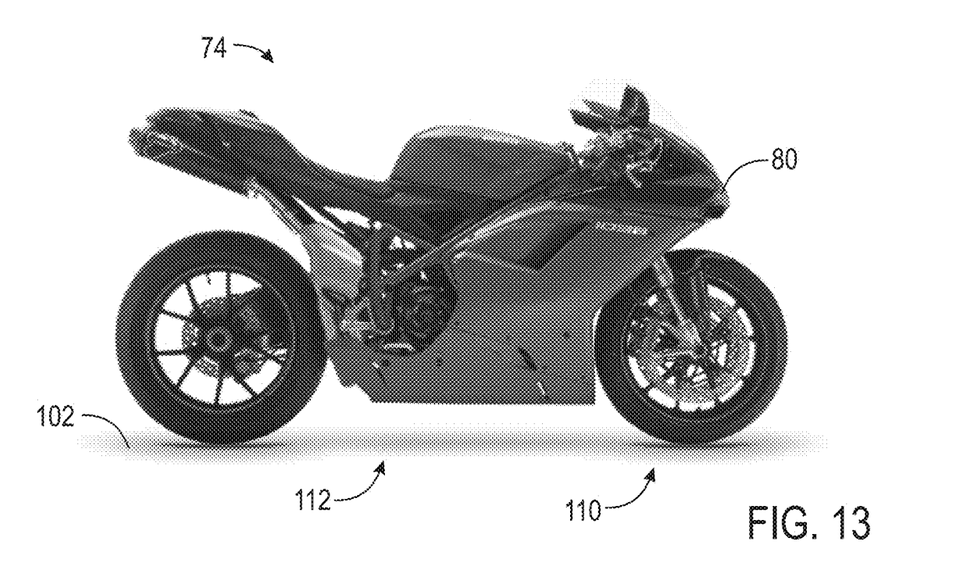
FIG. 13 depicts the original image with the contact shadow applied, representing a resulting embodiment of the method of FIG. 6.

Returning to FIG. 6, once constructed the contact shadow image, i.e., the shadow effect, is displayed (block 74) with the original image 80, typically at some offset specified by the user. The output of this final step, in the context of the present example, is depicted in FIG. 13, where the final image is displayed, such as by a processor(s) 18 on a display 12, as part of the operation of a word processing program, a spreadsheet program, or a presentation program. As can be seen in this example, the contact shadow 102 creates the impression that the depicted motorcycle image (i.e., original image 80) is in contact with (i.e., touching) the virtual surface 112 on which the contact shadow 102 is projected.

Figure 14:
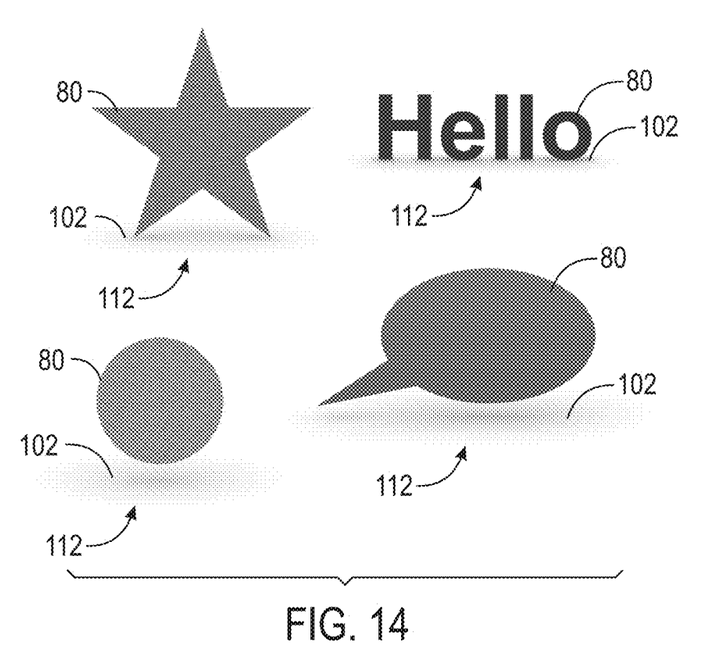
FIG. 14 is a view illustrating other example embodiments resulting from the method of FIG. 6, in accordance with aspects of the present disclosure.

In addition, FIG. 14 provides examples of other final images where contact shadows 102 have been created using the process discussed herein and are displayed with the respective original images 80. As shown, the described process may create contact shadows 102 for various shapes, image, and text objects. As indicated in the preceding discussion, various parameters controlling the appearance and display of the contact shadows 102 and respective original images 80 exist.

In the depicted images, the star image appears to be touching the virtual surface 112 on which the corresponding contact shadow 102 is projected. It should be noted that the contact shadow 102 appears finely tuned for the particular original image 80 (i.e. star) as a result of the disclosed process. In particular, the shadow surrounding the bottom tips of the star may be darker than the shadow that extends away from the tips. Likewise, the text-based image 80 reading "Hello" also appears to be contacting the virtual surface 112 as a result of the application of the contact shadow 102. Here, too, the contact shadow incorporates denser pixels (i.e. darker) surrounding the portions of the text that have the appearance of being in contact with or proximate to the virtual surface 112. Further examples of original images 80 (i.e. the circle and the dialog bubble) appear to be hovering above the virtual surface 112 as the result of the offset between the original image 80 and the contact shadow 102 being set to create the appearance of separation between the respective objects 80 and the virtual surface 112. As shown in these examples, the contact shadow 102 is also generated to be more transparent and fainter as the offset between the original image 80 and the virtual surface 112 is increased.

Figure 15:
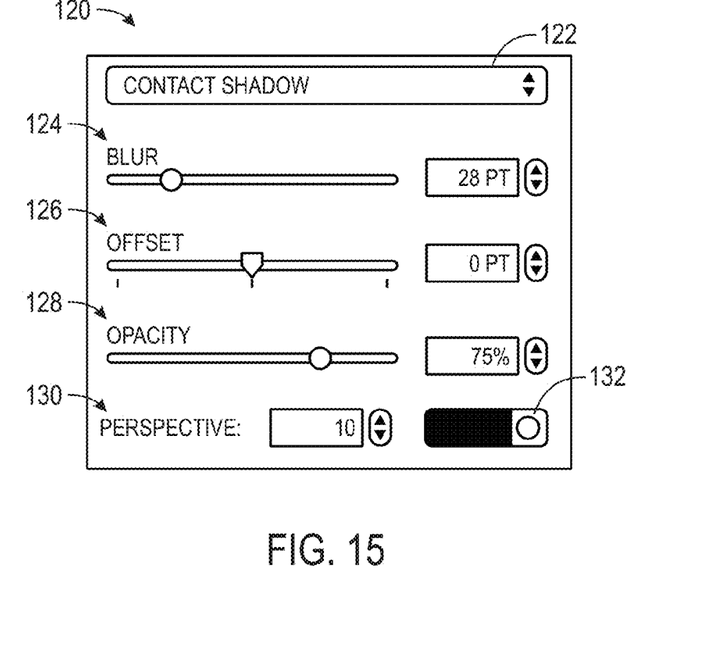
FIG. 15 is a view illustrating an example control menu, in accordance with aspects of the present disclosure.

With respect to the various parameters that may control the generation and/or appearance of contact shadows 102, FIG. 15 depicts an example of controls 120 that may be used to set or adjust these parameters. As will be appreciated, these controls 120 may be provided as part of a control menu or a control window 46 displayed by a computer application (e.g., a presentation application, a spreadsheet application, or a word processing application) in response to a user invoking a contact shadow effect or modification routine. Turning to the depicted controls depicted in FIG. 15, the user is presented with various controls to configure or adjust the appearance of a contact shadow effect. In this example, the controls 120 include controls such as an effect dropdown 122 by which the contact shadow effect may be selected, a blur slider 124, an offset slider 126, an opacity slider 128, a perspective control 130, and a color control 132. In the illustrated embodiment, the effect dropdown 122 has been set to "Contact Shadow", and using the sliders and controls, the user can change the amount of blurring the contact shadow exhibits, the apparent offset from the virtual surface on which the shadow is projected, the perspective (the apparent angle from which the angle is projected), the opacity, and the color of the shadow.

Figure 16:
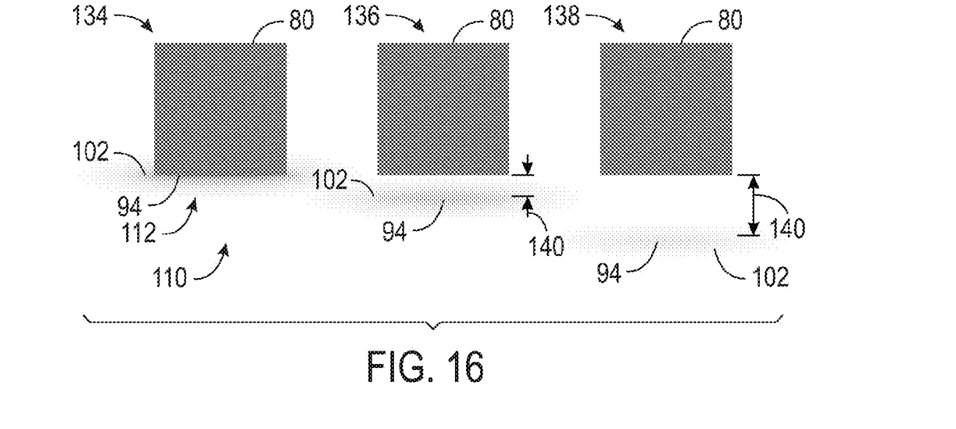
FIG. 16 is a view illustrating example embodiments of changing an offset between a contact shadow and an original image on a canvas, in accordance with aspects of the present disclosure.

To illustrate the effects of certain of these controls, FIG. 16 is a view depicting examples of changing the offset 140 between the contact shadow 102 and the original image 80 with respect to the virtual surface 112 on which the contact shadow 102 is projected. In the first example 134, the original image, which is a square object, has zero offset with the contact shadow 102. In this example, the blurred first slice 94 (i.e., the inner slice) may include the most dense pixels (i.e. is darker) to give the impression that the original image 80 is contacting the virtual surface 112. The second example 136 depicts the original image 80 with an increased offset 140 and a contact shadow 102 that, relative to the first example, is expanded horizontally and is more transparent to create the impression of greater distance between the object and the virtual surface 112 on which the shadow is projected. Likewise, the first slice 94 (i.e., the inner slice) includes less dense pixels (i.e. is fainter) due to the increased offset. Further, in the third example 138, the original image 80 has an even larger offset 140 which proportionally stretches the contact shadow 102 and increases its transparency to create the appearance of even greater separation distance. As shown in this example, the first slice 94 (i.e., the inner slice) has nearly disappeared because the offset 140 is almost at a maximum value.

Figure 17:
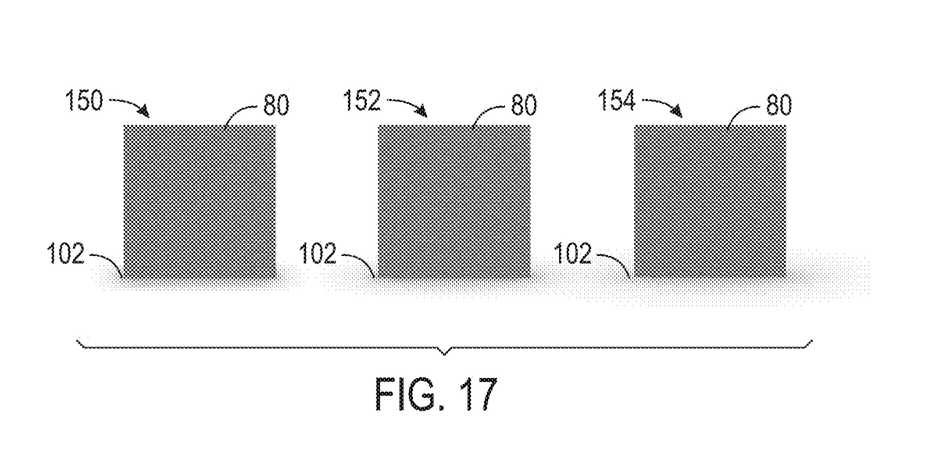
FIG. 17 is a view illustrating example embodiments of changing a blur of a contact shadow on a canvas, in accordance with aspects of the present disclosure.

As noted above, the user may also change the amount of blur utilized in generating the contact shadow 102, which may create an impression or appearance of a shadow generated by different types of or quality of light sources or of different distances between the virtual light source and the object 44. By way of example, FIG. 17 depicts three examples of contact shadows 102 generated using different blur settings, as may be specified using the control 124. For example, when the user changes the amount of blur using the blur slider 124, different Gaussian blur radiuses may be used to increase or decrease the amount of blur applied in generating the contact shadow 102. In the first example 150, the amount of blur is the least of the three examples and, as shown, the contact shadow 102 may be very small and condensed around the original image 80. As the amount of blur is increased, the contact shadow 102 may be visible further away from the apparent contact point between the original image 80 and the virtual surface 112, as depicted in examples 152 and 154.

Figure 18:
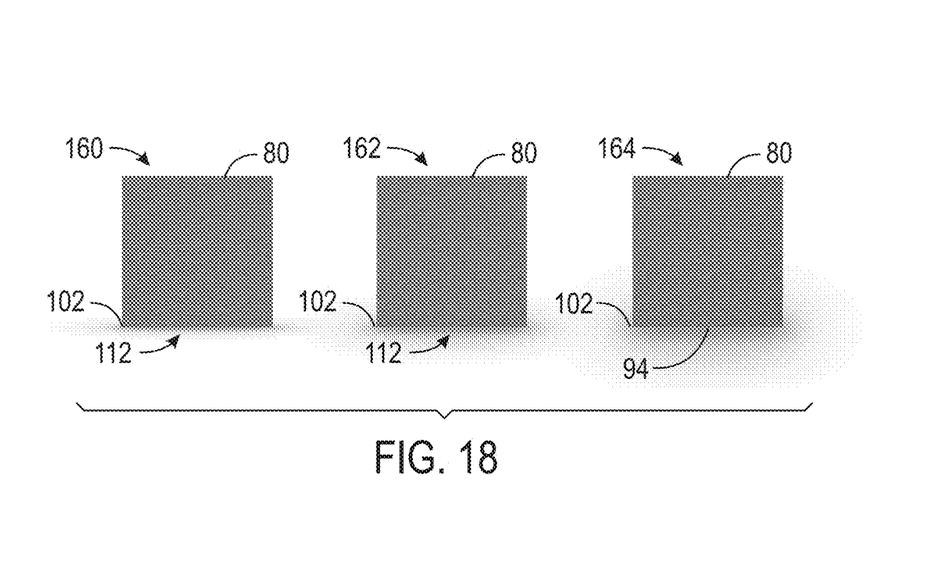
FIG. 18 is a view illustrating example embodiments of changing perspective and resulting contact shadows on a canvas, in accordance with aspects of the present disclosure.

Further, FIG. 18 illustrates embodiments of configuring the contact shadow 102 to alter the projection angle of the contact shadow 102 with respect to the original image, i.e., the perspective. For example, in the first example 160, there is no offset so the original image 80 appears to be contacting the virtual surface 112. In addition, the perspective is set to give the impression that the projection angle is parallel to the virtual surface 112 such that the contact shadow 102 has the appearance of generally being projected behind the original image 80. As a result, the contact shadow 102 is thinner and more transparent and is only visible at the front edge of the object 80. As mentioned above, the user may modify the perspective using the perspective control 130, and as the perspective increases the projection angle may be raised (or lowered) with respect to the projection surface 112, as shown in the second and third examples, 162 and 164. The second example 162 depicts the projection angle being increased, thus the contact shadow 102 appears larger, with denser pixels, and less transparent on the virtual surface 112 to reflect the angle at which the contact shadow 102 is projected with respect to the virtual surface 112. The third example 164 further illustrates how the contact shadow 102 changes in relation to the original image 80 as the perspective is increased.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A processor-implemented method for creating contact shadows comprising:
   converting an original image to an initial shadow image;
   cropping the initial shadow image to obtain at least two slices of the initial shadow image, wherein at least one of the slices comprises a smaller portion of the initial shadow image than the other slices;
   blurring the slices, wherein each slice is blurred to a different degree;
   overlaying the slices to create a combined shadow image;
   compressing the combined shadow image to create a contact shadow; and
   displaying the contact shadow on a virtual surface relative to the original image.

2. The processor-implemented method of claim 1, wherein one of the slices is made more transparent than at least another slice.

3. The processor-implemented method of claim 1, wherein the at least two slices are cropped horizontally or vertically from the initial shadow image based on a direction the contact shadow is to be cast.

4. The processor-implemented method of claim 1, wherein the combined shadow image is compressed horizontally or vertically based on a direction the contact shadow is to be cast.

5. The processor-implemented method of claim 1, wherein the blurring is implemented using Gaussian blur radiuses.

6. The processor-implemented method of claim 1, wherein the amount of cropping is determined based on an offset of the virtual surface from the original image.

7. The processor-implemented method of claim 1, wherein the contact shadow is characterized by parameters corresponding to a blur, offset, opacity, perspective, and color, which can be configured.

8. The processor-implemented method of claim 1, wherein one of the slices is removed from the combined shadow image when a maximum offset between the virtual surface and the original image is reached.

9. A non-transitory, tangible computer-readable medium encoding processor-executable routines, wherein the routines, when executed by a processor cause acts to be performed comprising:
   cropping an initial shadow image into an inner and an outer slice, wherein the outer slice comprises a larger percentage of the initial shadow image than the inner slice and the inner and outer slices are cropped either vertically or horizontally based on which direction a contact shadow is to be cast;

blurring the inner and outer slices based on a fixed ratio, wherein the inner slice is blurred less than the outer slice; and overlaying the inner and outer slices to create a combined shadow image and compressing the combined shadow image either vertically or horizontally based on which direction the contact shadow is to be cast, to generate the contact shadow.

10. The non-transitory, tangible computer-readable medium of claim 9, wherein the inner slice receives one-third of the amount of blurring that is applied to the outer slice.

11. The non-transitory, tangible computer-readable medium of claim 9, wherein the routines, when executed by the processor, cause further acts to be performed comprising:

displaying the contact shadow on a virtual surface in relation to a corresponding original image in a visual representation.

12. The non-transitory, tangible computer-readable medium of claim 11, wherein the visual representation comprises a presentation, a spreadsheet, or a word-processing document.

13. The non-transitory, tangible computer-readable medium of claim 11, wherein the initial shadow image is generated by converting an original image to black and white, grayscale, or any other selected color.

14. A processor-based system, comprising:

an electronic device comprising one or more processors configured to execute computer-readable instructions; and a presentation application capable of displaying visual representations, executed via the one or more processors of the electronic device, configured to:

create a contact shadow for an original image in the visual representation by:

converting the original image to an initial shadow image;

cropping the initial shadow image to obtain an inner slice and an outer slice of the initial shadow image, wherein the inner slice comprises a portion of the outer slice; and blurring the inner and outer slices to different degrees;

superposing the differently blurred inner and outer slices; and compressing the superposed and differently blurred inner and outer slices to form the contact shadow.

15. The processor-based system of claim 14, wherein the amount of cropping performed on the initial shadow image to obtain the inner slice and outer slice is based on one or more of an offset or a fixed ratio.

16. The processor-based system of claim 14, wherein the cropping is performed on the bottom of the initial shadow image.

17. A non-transitory computer readable medium, comprising computer-readable instructions configured to:

perform a contact shadow creation action comprising:

obtaining an initial shadow image by converting a selected original image to black and white or grayscale;

cropping the initial shadow image to obtain a plurality of slices of the initial shadow image;

for each of the plurality of slices, blurring the respective slice to a different degree based on one or more of a configurable ratio, a fixed ratio, or an offset; and combining and compressing the differently blurred plurality of slices to create a contact shadow in accordance with one or more configured properties.

18. The non-transitory, tangible computer-readable medium of claim 17, wherein the fixed ratio is set so that one of the plurality of slices receives one-third of the amount of blurring that is applied to another slice.

19. The non-transitory, tangible computer-readable medium of claim 17, comprising further instructions to alter the contact shadow's blur in accordance with a blur slider in a control window.

20. The non-transitory, tangible computer-readable medium of claim 17, wherein the one or more configured properties comprise a blur, offset, opacity, perspective, or color.

21. The non-transitory, tangible computer-readable medium of claim 17, wherein prior to the creation of the contact shadow, the combined and differently blurred plurality of slices are modified based on a viewing perspective.

22. A processor-implemented method for creating a contact shadow in a visual representation, comprising:

generating the contact shadow by:

differently blurring separate but overlapping portions of an initial shadow image derived from an original image;

combining the differently blurred portions to generate a preliminary contact shadow;

based on a viewing perspective, adjusting the preliminary contact shadow in one dimension to generate the contact shadow; and displaying the contact shadow with the original image.

23. The processor-implemented method of claim 22, wherein the portions of the initial shadow image vary in size in accordance with one or more of a fixed ratio or an offset.

24. The processor-implemented method of claim 22, wherein adjusting the preliminary contact shadow in one direction comprises compressing the preliminary contact shadow either vertically or horizontally or expanding the preliminary contact shadow.

25. The processor-implemented method of claim 22, wherein the viewing perspective is configurable using a perspective control in a control window.

* * * * *